US012510047B1

(12) United States Patent
Leute et al.

(10) Patent No.: US 12,510,047 B1
(45) Date of Patent: Dec. 30, 2025

(54) INLET METERING VALVE BLOCK

(71) Applicant: Transportation IP Holdings, LLC, Norwalk, CT (US)

(72) Inventors: Pisey Leute, Waterford, PA (US); Sudheer Khanapure, Karnataka (IN); Manuel Flores, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/756,862

(22) Filed: Jun. 27, 2024

(51) Int. Cl.
*F02M 59/36* (2006.01)
*F02M 37/00* (2006.01)

(52) U.S. Cl.
CPC ...... *F02M 59/366* (2013.01); *F02M 37/0023* (2013.01)

(58) Field of Classification Search
CPC ..... F02M 37/0023; F02M 59/361–363; F02M 59/366–368
See application file for complete search history.

(56) References Cited

U.S. PATENT DOCUMENTS 5,701,873 A * 12/1997 Schneider .......... F02M 63/0225 123/462
5,819,704 A * 10/1998 Tarr ....................... F02M 57/02 123/506
2007/0051340 A1* 3/2007 Tsujimoto ............. F02D 41/221 123/378
2008/0078362 A1* 4/2008 Tian ..................... F02M 59/366 123/506
2008/0105235 A1* 5/2008 Ogawa ................... F02M 59/34 123/456
2008/0115766 A1* 5/2008 Ricco ..................... F02M 53/00 123/457
2013/0013174 A1* 1/2013 Nistler ................ F02D 41/3854 701/112
2013/0013175 A1* 1/2013 Nistler .................... F02D 41/22 701/112
2016/0076504 A1* 3/2016 Anandhan .......... F02M 63/0225 123/456
2018/0216566 A1* 8/2018 Taxon ................. F02D 41/3845
2018/0372048 A1* 12/2018 Yamamoto ............. F02M 59/06
2019/0211792 A1* 7/2019 Anandhan ........... F16K 31/1223
2020/0149492 A1* 5/2020 Taxon ....................... F23K 5/04
(Continued)

FOREIGN PATENT DOCUMENTS

DE 102017204482 A1 * 9/2018 ............. F02M 59/34
EP 1617073 A1 * 1/2006 ......... F02D 41/3809
(Continued)

*Primary Examiner* — John M Zaleskas
(74) *Attorney, Agent, or Firm* — K&L Gates LLP

(57) ABSTRACT

An inlet metering valve (IMV) block may include a plurality of IMV apertures, wherein each aperture of the plurality of IMV apertures is adapted to receive at least one IMV of a plurality of IMVs. The IMV block may further include an internal fuel passage in fluid communication with the plurality of IMV apertures. The IMV block may further include a fuel inlet port fluidically couplable between a fuel inlet connector and the internal fuel passage, wherein the fuel inlet port is configured to transfer fuel from a fuel source to the internal fuel passage. Further, the IMV block may also include a plurality of mounting holes to releasably attach the IMV block to a fuel pump.

13 Claims, 8 Drawing Sheets

(56) References Cited

U.S. PATENT DOCUMENTS

| | | | | |
|---|---|---|---|---|
| 2020/0271068 | A1* | 8/2020 | Dodis | F02D 41/20 |
| 2021/0254588 | A1* | 8/2021 | Yamamoto | F02M 63/0022 |
| 2021/0277845 | A1* | 9/2021 | Taxon | F23K 5/04 |
| 2021/0396199 | A1* | 12/2021 | Zielinski | F02D 41/3845 |
| 2024/0247628 | A1* | 7/2024 | Kato | F02M 59/48 |
| 2024/0247629 | A1* | 7/2024 | Ogawa | F02M 59/08 |
| 2024/0295203 | A1* | 9/2024 | Ogawa | F04B 53/16 |

FOREIGN PATENT DOCUMENTS

| | | | | |
|---|---|---|---|---|
| JP | 07269461 | A * | 10/1995 | |
| JP | 2009243416 | A * | 10/2009 | |
| WO | WO-2005052357 | A1 * | 6/2005 | F02M 59/366 |

* cited by examiner

INLET METERING VALVE BLOCK

BACKGROUND

Technical Field

Embodiments of the subject matter described herein relates to installing and controlling one or more inlet metering valves (IMV) for a fuel pump.

Discussion of Art

In various applications, vehicles (e.g., automobiles, rail vehicles, buses, trucks, mining vehicles, manned or unmanned aircraft, agricultural vehicles, marine vessels, etc.) rely on high pressure fuel pumps to convert fuel from a low-pressure state to a high-pressure state in order to feed the high-pressure fuel into the fuel injectors for combustion in an engine. In order to ensure the appropriate amount of fuel is being fed into the high-pressure fuel pump to ensure adequate fuel supply to the engine, many high-pressure fuel pumps incorporate inlet metering valves (IMV), also known as fuel metering valves, directly into the high-pressure fuel pump.

IMVs are relied upon to regulate how much low-pressure fuel enters the high-pressure fuel pump. IMVs are generally mounted directly on the high-pressure fuel pump by the manufacturer of the high-pressure fuel pump. Although the supplier of the high-pressure fuel pump is typically also the supplier of the IMV, the high-pressure fuel pump and the IMV may be manufactured by separate entities. While high-pressure fuel pumps from certain manufacturers may be more desirable over high-pressure fuel pumps from alternative manufacturers due to improved reliability or applicability to particular applications, it does not necessarily follow that the IMV from the preferred high-pressure fuel pump manufacturer is as desirable as the high-pressure fuel pump itself. For example, vehicle manufacturers or operators may purchase a preferred supplier's high-pressure fuel pump to obtain the benefits of the preferred high-pressure fuel pump. However, the vehicle manufacturer/operator may not want to use that high-pressure fuel pump supplier's IMV because it may lack the same degree of reliability as the high-pressure fuel pump.

Accordingly, while some known high-pressure fuel pumps may be capable of accommodating the high-pressure fuel pump supplier's predetermined IMV, these known systems limit users from incorporating alternative or more than one IMVs onto a high-pressure fuel pump. It may be desirable to have an IMV block and method of use thereof that differ from those that are currently available.

BRIEF DESCRIPTION

In one example, an inlet metering valve (IMV) block is provided. The IMV block may include a plurality of IMV apertures, wherein each IMV aperture of the plurality of IMV apertures is adapted to receive at least one IMV of a plurality of IMVs. The IMV block may further include an internal fuel passage in fluid communication with the plurality of IMV apertures. Additionally, the IMV block may further include a fuel inlet port fluidically couplable between a fuel inlet connector and the internal fuel passage, wherein the fuel inlet port is configured to transfer fuel from a fuel source to the internal fuel passage. The IMV block may further include a plurality of mounting holes to releasably attach the IMV block to the fuel pump.

In one example, an inlet metering valve (IMV) system may include a first IMV, a second IMV, and an IMV block separable from a fuel pump. The IMV block may include a first IMV aperture adapted to receive the first IMV and a second IMV aperture adapted to receive the second IMV. The IMV block may also include an internal fuel passage in fluid communication with the first IMV aperture and the second IMV aperture.

Additionally, the IMV block may further include a fuel inlet port fluidically couplable to a fuel inlet connector and the internal fuel passage, wherein the fuel inlet port is configured to transfer fuel from a fuel source to the internal fuel passage. The IMV block may further include a plurality of mounting holes to releasably attach the IMV block to the fuel pump.

In one example, a method of controlling fuel flow from a fuel source to a fuel pump through an inlet metering valve (IMV) block separable from the fuel pump may include determining a number of two or more IMVs operably engaged with the IMV block. The method may further include selecting an operational mode based on the number of IMVs operably engaged with the IMV block. Additionally, the method may further include operating each IMV of the number of IMVs according to the selected operational mode.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to inlet metering valve (IMV) blocks and methods for controlling fuel flow in an IMV block. As previously discussed, known high-pressure fuel pump suppliers integrate supplier selected IMVs on to a high-pressure fuel pump, and vehicle manufacturers/operators are generally required to purchase a high-pressure fuel pump with the IMV installed. However, while a given supplier's high-pressure fuel pump may be reliable and preferable for a particular application, that supplier's selected IMV may not be appropriate for the same application. Additionally, IMVs are known to have a shorter wear-life than most high-pressure fuel pumps. As such, IMVs may require more maintenance than the high-pressure fuel pump, or, absent such regular maintenance, may malfunction more frequently than the high-pressure fuel pumps. IMV maintenance or repairs may cause unwanted delays or stoppages.

Accordingly, it may be desirable to use an IMV block, as described herein, to incorporate a selected IMV from one supplier onto a selected high-pressure fuel pump from another supplier. Additionally, such an IMV block may be used to incorporate multiple IMVs into a single fuel pump for various redundancy or safety effects. The IMV block described herein provides a mounting configuration for one or more IMVs that permits the incorporation of additional safety features and/or separability from the high-pressure fuel pump.

Figure 1:
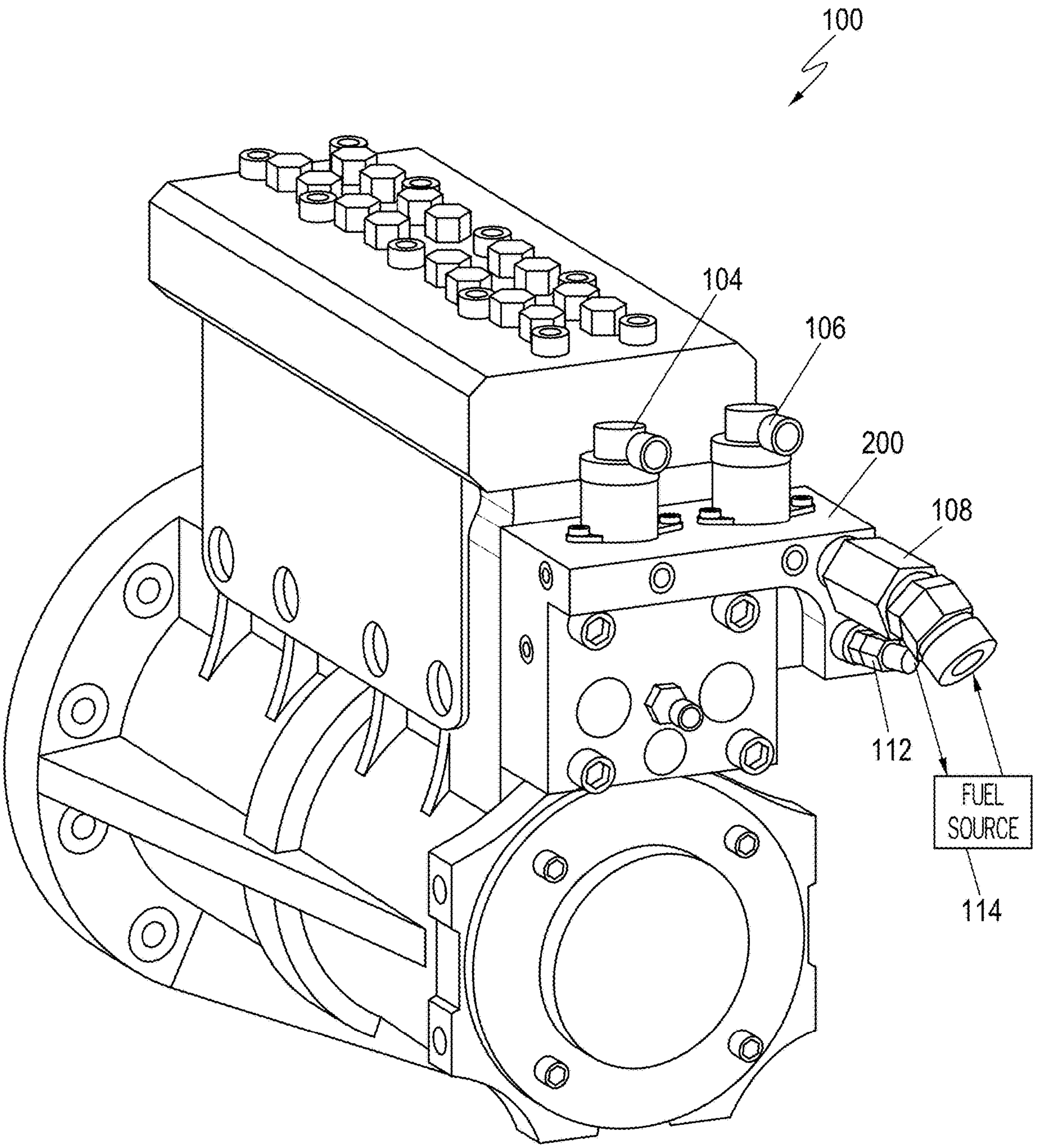
FIG. 1 illustrates one example of a fuel pump according to one aspect of the present disclosure.
Figure 5:
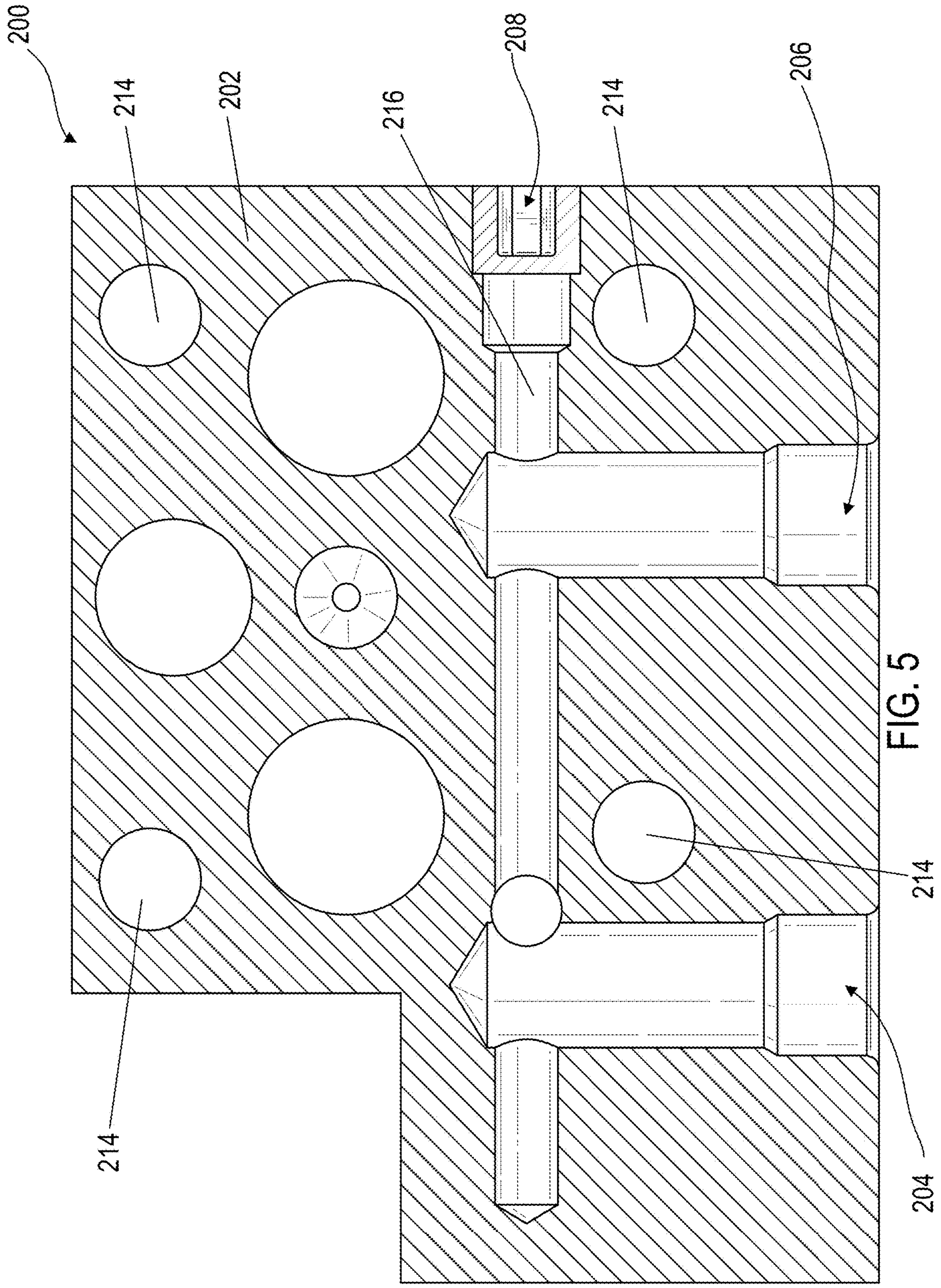
FIG. 5 is a cross-sectional view of the IMV block along section line 5-5 as shown in FIG. 3.

Referring now to the figures, FIG. 1 illustrates one example of a fuel pump 100 including an IMV block 200. The IMV block, which is separable from the fuel pump, may have a first IMV aperture adapted to receive a first IMV 104 and a second IMV aperture adapted to receive a second IMV 106. The first IMV and the second IMV are separately electrically controllable by a control circuit 300, which can be configured to operate the IMVs to regulate an amount of fuel transferred to the fuel pump. The IMV block also includes a fuel inlet port fluidically couplable between a fuel inlet connector 108, wherein the fuel inlet connector is configured to transfer fuel from a fuel source 114 through the fuel inlet port 208 to internal fuel passage 216, as shown in FIG. 5. The internal fuel passage can be in fluid communication with the first IMV aperture and the second IMV aperture.

Figure 2:
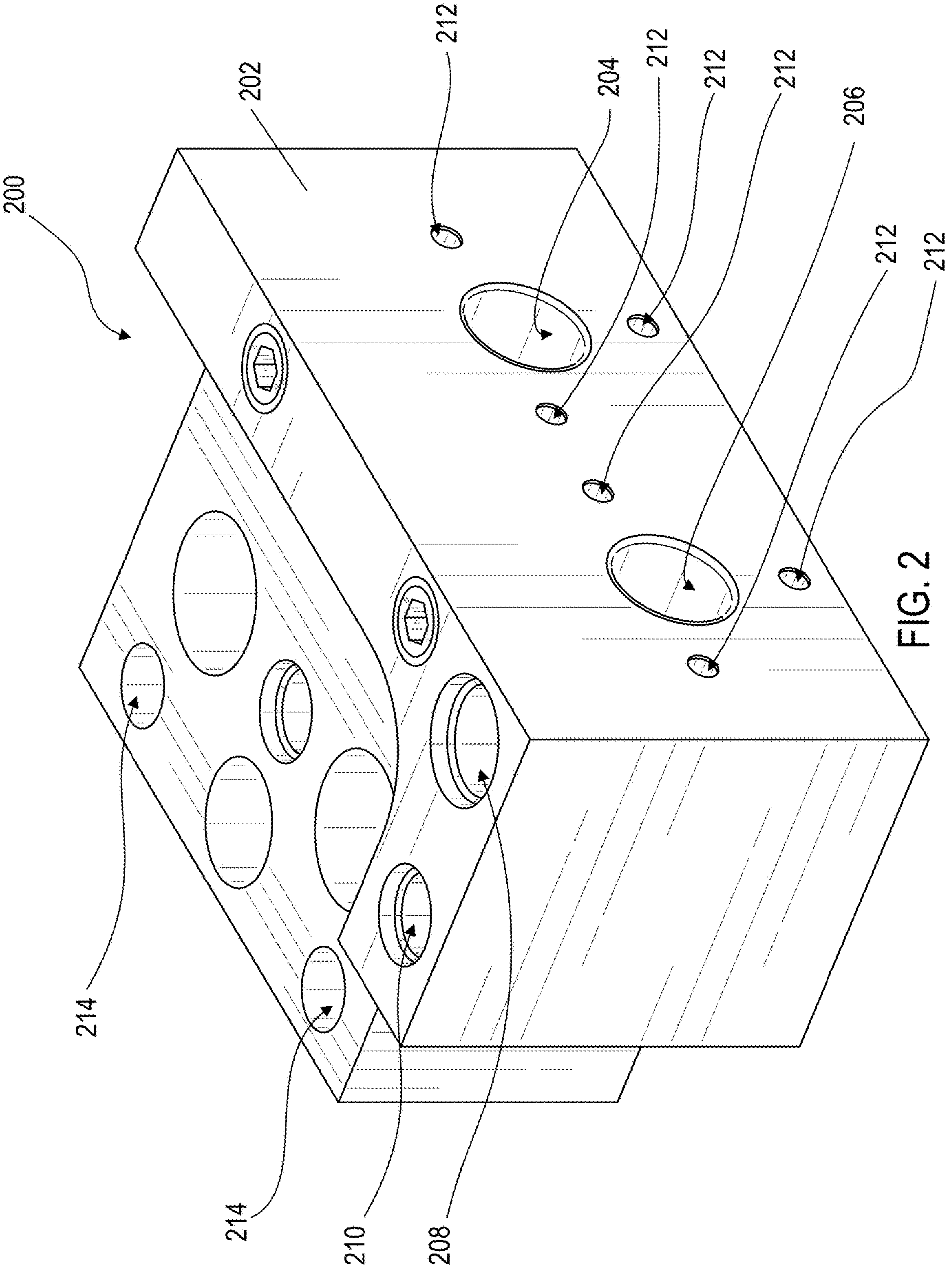
FIG. 2 illustrates an inlet metering valve (IMV) block useable with the fuel pump of FIG. 1 according to one aspect of the present disclosure.
Figure 3:
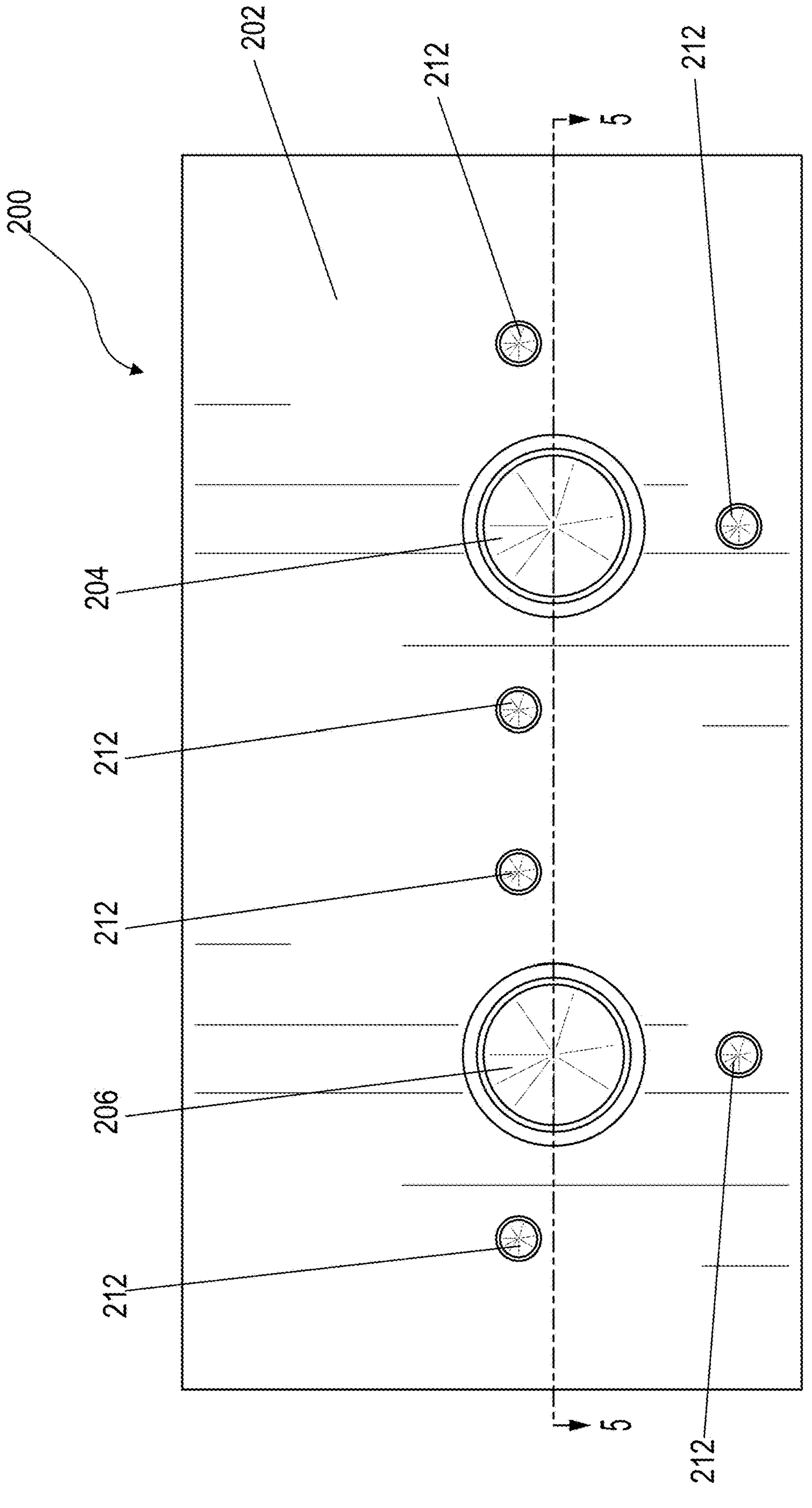
FIG. 3 is a top plan view of the IMV block of FIG. 1.
Figure 4:
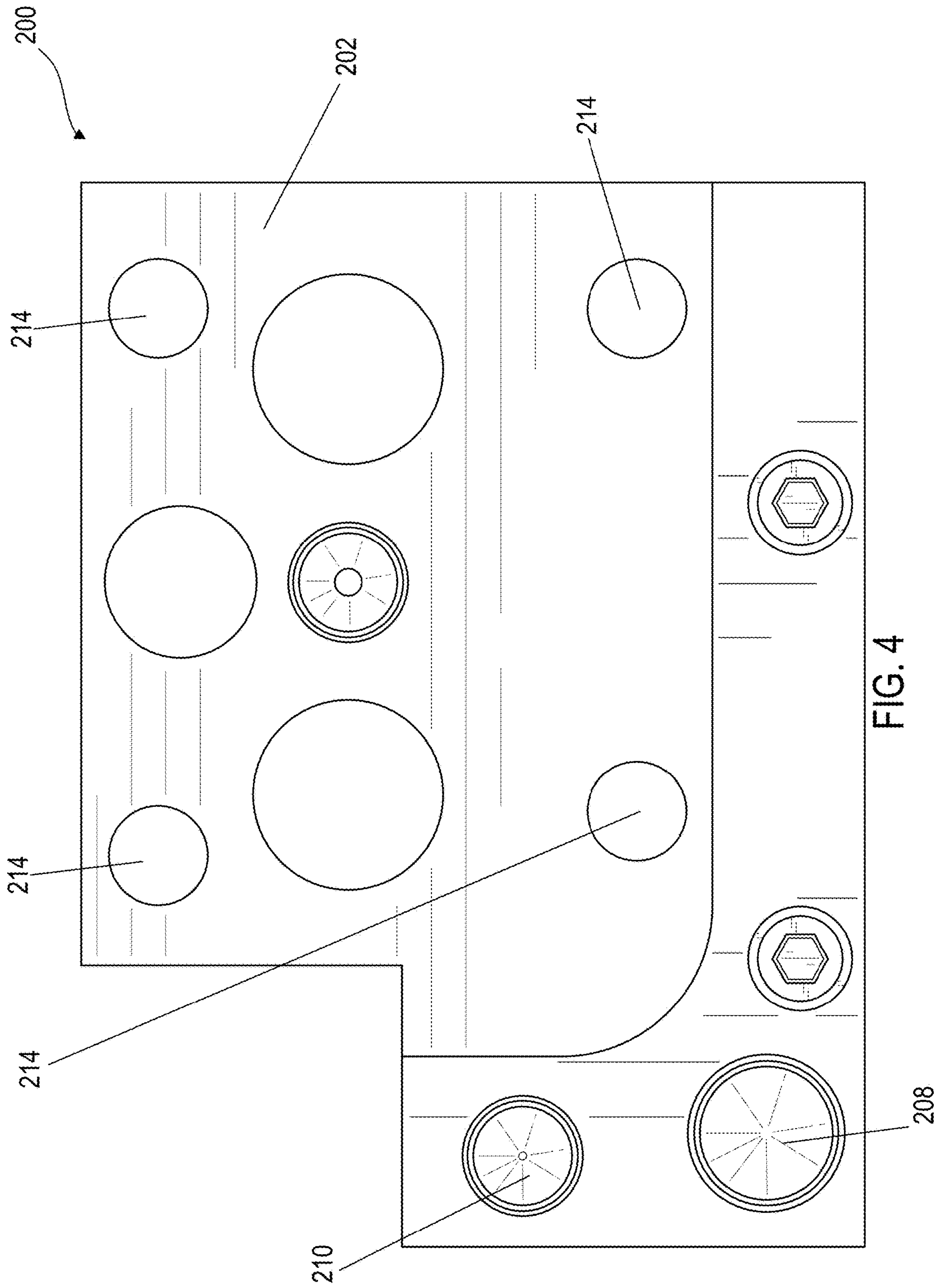
FIG. 4 is a front elevation view of the IMV block of FIG. 1.

With reference back to FIGS. 1 and 2, the IMV block further includes a fuel return port 210 fluidically couplable between a fuel return connector 112 and the internal fuel passage. The fuel return port can be configured to transfer fuel from the internal fuel passage back to the fuel source. In particular, fuel enters the IMV block through the fuel inlet port via the fuel inlet connector and is transferred into the internal fuel passage. The IMVs, as controlled by the control circuit, regulate how much fuel is transferred to the fuel pump from the fuel source. Any fuel that is not transferred to the fuel pump is cycled back through the system, e.g., back into the IMVs or to a fuel storage reservoir or tank.

Referring now to FIGS. 1 through 5, an IMV block 200 is illustrated. The IMV block includes a body 202 which defines a first IMV aperture 204 adapted to receive the first IMV 205 and a second IMV aperture 206 adapted to receive the second IMV 207. To attach the first IMV and the second IMV to the body of the IMV block, the IMV block may have a plurality of IMV mounting holes 212 which are arranged to accommodate the mounting pattern of an IMV. Although shown in FIGS. 1 through 5 with three mounting holes per IMV, the IMV block may have as many or as few mounting holes as necessary to secure the IMV to the IMV block.

In embodiments, the IMV block may be configured for mounting the IMVs on any of the faces of the IMV block. Although FIGS. 1 through 5 show the IMVs as mounted on the top surface of the IMV block, it is possible to mount the IMVs on any face (e.g., the bottom surface of the IMV block, the front face of the IMV block, the left side of the IMV block, the right side of the IMV block, etc.).

Figure 8:
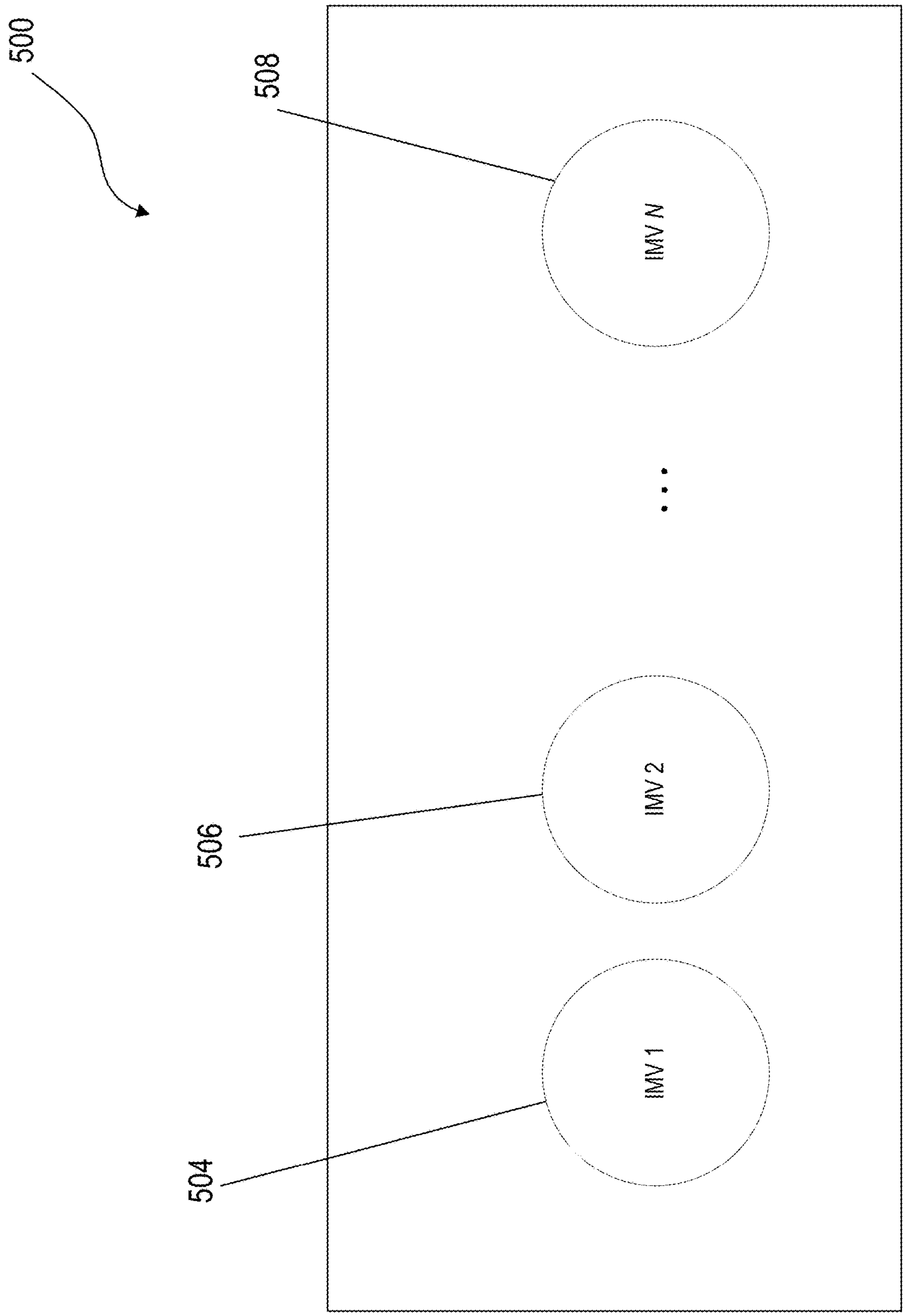
FIG. 8 illustrates an example of an IMV block according to one aspect of the present disclosure.

Further, although the IMV block shown in FIGS. 1 through 5 has two IMVs, embodiments of an IMV system (e.g., IMV block and at least one IMV operably coupled to the block, where the block is configured to be releasably coupled to a fuel pump) may include only one IMV or more than two IMVs. For example, as shown in FIG. 8, an IMV system 500 can include a plurality of IMVs (e.g., a first IMV 504, a second IMV 506, through an Nth IMV 508, wherein N is an integer greater than two) which are each electrically controllable by the control circuit or more than one control circuit.

In further reference to FIGS. 2 through 5, the IMV block also includes a fuel inlet port 208 which is fluidically couplable to the fuel inlet connector, as described above, to transfer fuel from a fuel source to the internal fuel passage of the IMV block. As shown more clearly in FIG. 5, the fuel inlet port allows fuel to be transferred into the internal fuel passage 216. From the internal fuel passage, fuel may be fed to the first IMV aperture and the second IMV aperture, such that when a first and second IMV are operatively engaged with the first IMV aperture and second IMV aperture, the first and second IMV can regulate how much fuel is transferred to the fuel pump.

The fuel inlet port can include a filter to remove any debris from the fuel prior to entering the internal fuel passage. The filter may be a filter screen configured to catch any debris within the low-pressure fuel supply. The filter may be used to ensure that the low-pressure fuel entering the IMV(s), and ultimately the high-pressure fuel pump, are clean. This may also be referred to herein as a "last-chance filter." The filter may be installed in the fuel inlet connector, such that the fuel entering the fuel inlet port is filtered prior to entering the internal fuel passage through the fuel inlet port.

The IMV block also includes a fuel return port 210 which is fluidically couplable between the fuel return connector and the internal fuel passage. The fuel return port can be configured to transfer any excess or unused fuel from the internal fuel passage back to the fuel source, as described above.

The IMV block as described herein may be mounted onto the high-pressure fuel pump in various ways. For example, the IMV block may include a number of IMV block mounting holes 214 to releasably attach the IMV block to the fuel pump. In particular, the IMV block may have two, four, five, or any other number of IMV block mounting holes needed to accommodate a fastener for securing the IMV block to the fuel pump. The IMV block mounting holes may be arranged in a mounting pattern that corresponds to the mounting pattern of the supplier provided IMV block on the supplier's high-pressure fuel pump. In such situations, the supplier-provided IMV block may be removed, and the IMV block in accordance with the present disclosure may be substituted in place of the supplier-provided IMV block. The IMV block mounting holes may be oriented in the same direction as the fuel inlet port. Further, the IMV block mounting holes may also be oriented in a direction that is orthogonal to the plurality of IMV apertures, as described above. Any fastener capable of securely mounting the IMV block to the fuel pump may be used. For example, the fastener may include bolts, screws, adhesives, or any other suitable fastener. The IMV block may also be mounted to the high-pressure fuel pump using a pump supporting bracket which can separate the IMV block from the high-pressure fuel pump.

Figure 6:
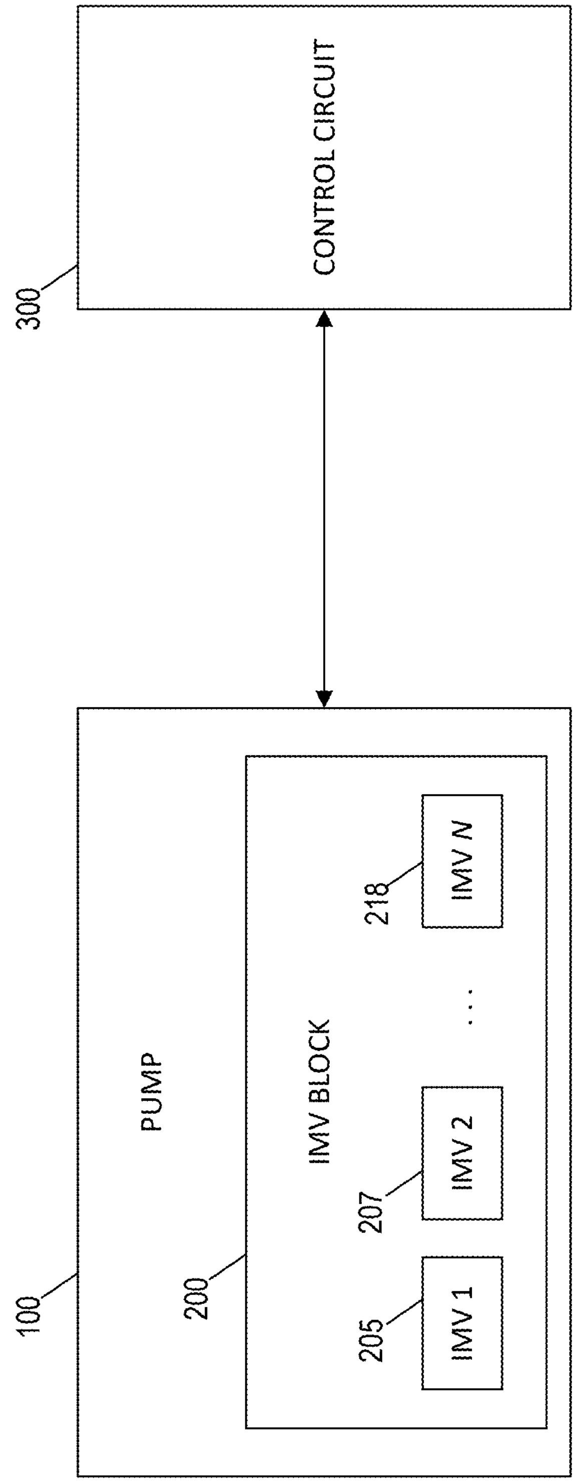
FIG. 6 is a block diagram of a control circuit according to one aspect of the present disclosure.

Referring now to FIG. 6, the IMVs 205, 207, 218 are electrically controllable by the control circuit 300. The control circuit can be configured to enable the plurality of IMVs to regulate an amount of fuel transferred from the fuel source to the fuel pump. In accordance with at least one aspect of the present disclosure, the control circuit electrically controls the IMVs. For example, the control circuit can send a pulse width modulation (PWM) electrical current signal to the IMV, which can energize an internal solenoid of the IMV. Upon receiving the electrical current signal from the control circuit, the solenoid can generate a force to move an internal valve piston inside the IMV. The movement of the internal valve piston can regulate how much fuel can enter the high-pressure pump. An increase in the current signal sent by the control circuit can correspond to a decrease in the amount of fuel flowing into the high-pressure pump. Similarly, a decrease in the current signal sent by the control circuit can correspond to an increase in the amount of fuel flowing into the high-pressure pump. For example, the current profile for an IMV can range from 0A to 1.8A, where 0A can cause the IMV to be fully open and 1.8A can cause the IMV to be fully closed.

In various embodiments, each of the IMVs may be operable at the same time, such that each of the IMVs are used during operation of the high-pressure fuel pump to regulate the fuel flow. To do so, the control circuit can concurrently operate the first IMV and the second IMV to cooperatively regulate the amount of fuel transferred from the fuel source to the fuel pump. In particular, fuel may be fed to both IMVs at the same time and fuel from both IMVs may be combined and sent to the high-pressure fuel pump. This may allow two IMVs to regulate fuel flow concurrently. If there are more than two IMVs, the control circuit can be configured to concurrently operate all or some of the IMVs (e.g., the first IMV, the second IMV, and the third IMV, or any combination thereof) at the same time, such that whichever IMV is in an active operational state is configured to cooperatively regulate the amount of fuel transferred from the fuel source to the fuel pump.

In various embodiments, each of the IMVs installed on the fuel block may be alternately operated. For example, the control circuit may operate the first IMV for a first period and then, after the first period, operate the second IMV for a second period. The first period and the second period can occur consecutively. The control circuit can also set the first IMV in an inactive state during the second period and set the second IMV in an inactive state during the first period. Further, the first period and the second period periodically can repeat, such that the first IMV and the second IMV alternately operate.

Using an IMV block as described herein to incorporate two or more IMVs into a high-pressure fuel pump can provide additional safety and redundancy features to the fuel system. For example, in various embodiments, the control circuit can monitor the first IMV for a fault condition and, based on the control circuit detecting the fault condition, switch from operating the first IMV to the second IMV. A fault condition may include any instance where the first IMV is performing below a performance threshold/criteria. For example, a fault condition may occur if power output of the first IMV is below a predetermined threshold/criteria or zero. Similarly, a fault condition may occur if the first IMV is no longer receiving and/or transmitting communications to or from the control circuit. In particular, a fault condition may be indicative of any instance where the first IMV is not performing according to one or more designated criteria. In such instances, the control circuit may change the first IMV from an active state to an inactive state, and simultaneously changes the second IMV from an inactive state to an active state to prevent any damage to the fuel system or the operation of the vehicle as a result of the fault condition of the first IMV.

Similarly, the control circuit can also monitor for fault conditions when there are more than two IMVs. Specifically, the control circuit can be configured to operate the first IMV for a first period and, after the first period, operate the second IMV for a second period, such that the first period and the second period occur consecutively. The control circuit can also monitor the first IMV and the second IMV for a fault condition and, in response to a fault condition, switch from operating the first IMV and the second IMV to the third IMV. In other words, the third IMV can act as a redundant or back-up IMV in the event of a fault condition in order to allow the vehicle to continue operating despite a fault in any of the active IMVs.

Another safety/redundancy feature provided by the IMV block incorporating multiple IMVs into a high-pressure fuel pump, as described herein, includes the ability to run diagnostics on one or more of the IMVs to ensure it is functioning adequately. For example, the control circuit can run a diagnostic on the first IMV, determine a diagnosed parameter based on the diagnostic of the first IMV, compare the diagnosed parameter to a diagnostic parameter criteria, and switch from operating the first IMV to the second IMV based on the diagnosed parameter being greater than the diagnostic parameter criteria. The diagnosed parameter can be at least one of a power output of the first IMV, a fuel pressure from the first IMV, a voltage across the first IMV, or a resistance across the first IMV, or any combination thereof. The diagnostic parameter criteria may be a threshold value that is outside a range of designated operating conditions (e.g., a designated fuel pressure, a designated voltage, or a designated resistance) such that operating outside that range of designated operating conditions for an extended period of time may cause the IMV, the high-pressure fuel pump, or the fuel system itself to fail.

Generally speaking, in embodiments, a method of operating an IMV system may include sensing or otherwise determining respective operational characteristics of a first IMV and a second IMV in operation (e.g., the first and second IMVs are operably coupled to an IMV block portion of the IMV system, with the block being releasably coupled to a fuel pump), identifying a fault condition of one of the first IMV or the second IMV by comparing the operational characteristics that are determined to designated fault criteria, and changing an operational mode of the IMV system based on the fault condition that is identified, e.g., discontinuing use of, or changing a duty cycle of, the IMV associated with the fault condition, and commencing use of, or changing a duty cycle of, the other IMV.

The diagnostic capabilities described above may also apply to systems including more than two IMVs. For example, the control circuit may be configured to run a diagnostic on the first IMV and the second IMV. The control circuit can determine a first diagnosed parameter based on the diagnostic of the first IMV and determine a second diagnosed parameter based on the diagnostic of the second IMV. The control circuit can further compare the first diagnosed parameter and the second diagnosed parameter to a diagnostic parameter criteria and switch from operating the first IMV and the second IMV to the third IMV if the first diagnosed parameter or the second diagnosed parameter exceeds the diagnosed parameter criteria.

In various embodiments, the plurality of IMVs may be configured to communicate with the control circuit in a wired or a wireless configuration. For example, if the IMV block includes two IMVs, the first IMV and the second IMV can be in wired communication with the control circuit. In embodiments with more than two IMVs, each of the IMVs may be in wired communication with the control circuit. Alternatively, the plurality of IMVs may be in wireless communication with the control circuit. Some of the IMVs may be in wired communication with the control circuit, while others may be in wireless communication with the control circuit.

The IMV block disclosed herein can be manufactured using any manufacturing technique. For example, the IMV block may be machined, additively manufactured, or cast, among other manufacturing options. Certain manufacturing techniques, such as additive manufacturing or casting, may result in the IMV block having a lower weight than the same IMV block made using other methods.

Figure 7:
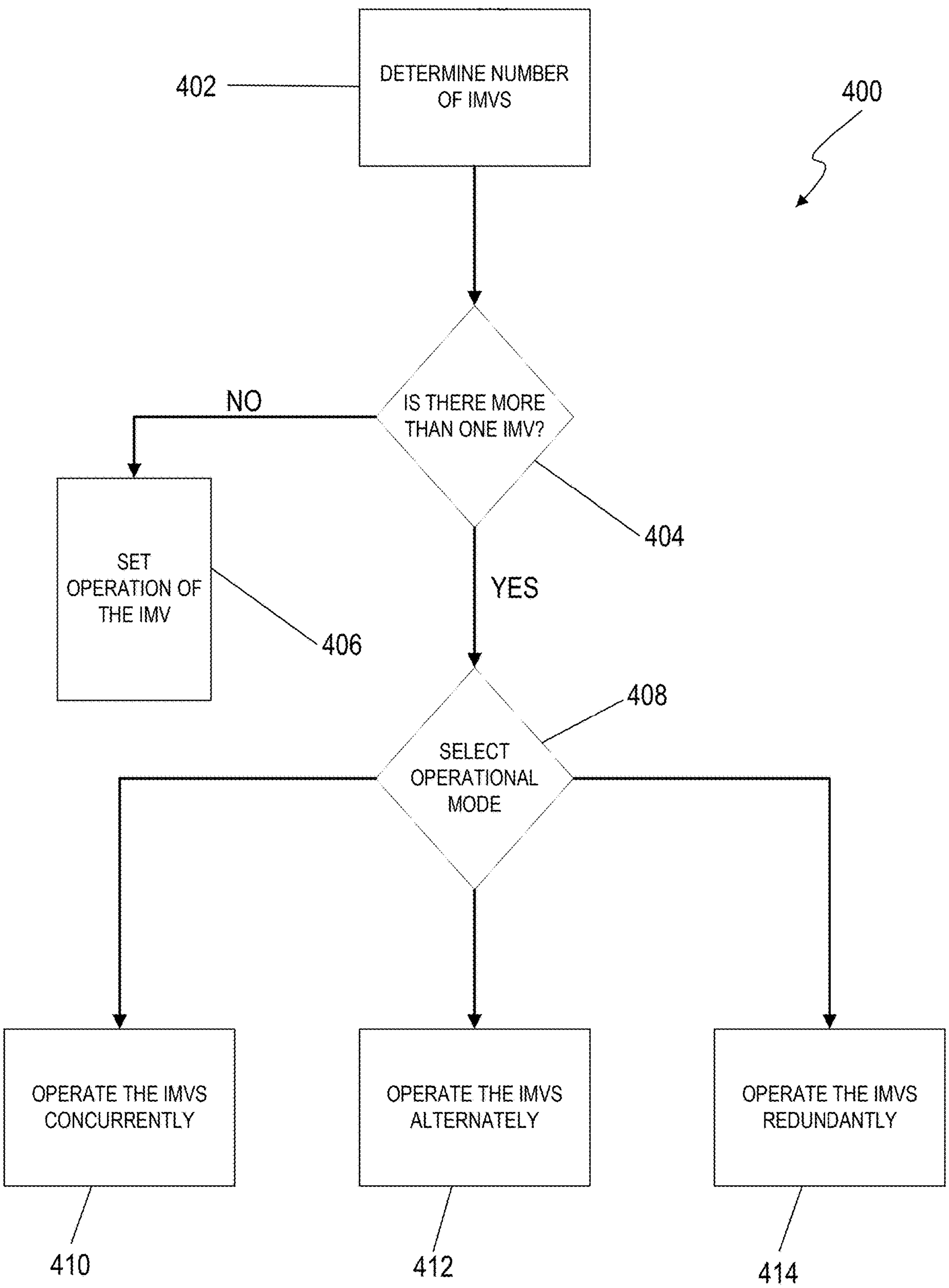
FIG. 7 illustrates a logic diagram of one example of a method for controlling fuel flow according to one aspect of the present disclosure.

Referring now to FIG. 7, a method 400 for controlling fuel flow from a fuel source to a fuel pump through an IMV block separable from the fuel pump is provided. The method provided herein may use the IMV block as described herein. The method described herein may include determining 402 a number of IMVs operably engaged with the IMV block. The method can further include determining 404, by the control circuit, whether there is one or more than one IMV operably engaged with the IMV block.

In a configuration where there is only one IMV operably engaged with the IMV block, the control circuit can set 406 the operation of the IMV to a standard operating procedure for the operation of an IMV to regulate fuel flow to the fuel pump.

In a configuration where there are more than one IMV operably engaged with the IMV block, the method can further include selecting 408, by the control circuit, an operational mode based on the number of IMVs operably engaged with the IMV block. The operational mode can include any of the operational modes described previously herein. For example, a first operational mode may include operating 410 each IMV of the number of IMVs operably engaged with the IMV block concurrently to cooperatively regulate the amount of fuel transferred from the fuel source to the fuel pump. A second operational mode may include operating 412 a first IMV of the number of IMVs for a first period, after the first period, operating a second IMV of the number of IMVs for a second period, such that the first period and the second period occur consecutively, and periodically repeat, such that the first IMV and the second IMV alternately operate. A third operational mode may include operating 414 the first IMV of the number of IMVs, monitoring the first IMV for a fault condition, and switching from operating the first IMV to a second IMV of the number of IMVs based on detecting the fault condition. The third operational mode, which includes monitoring for the fault condition, may be referred to herein as operating the IMV redundantly or redundant operation of the IMVs.

Any of the operational modes may be selected at any time. For example, the first operational mode may be used, wherein the number of IMVs operate concurrently, for a first period of time or a first application. Then, at a later point during operation of the system, it is switched from the first operational mode of operating the number of IMVs concurrently to the second operational mode in order to alternately operate the number of IMVs or the third operational mode to redundantly operate the number of IMVs.

The method may further include cycling back to the number of IMVs or to a fuel storage reservoir or tank any fuel that is not transferred to the fuel pump. For example, the fuel return port described above may be configured to transfer any excess fuel from the internal fuel passage of the IMV block to the fuel storage reservoir or tank.

While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

In embodiments, the IMV system (e.g., IMV block and two or more IMVs coupled to the IMV block) is operably coupled to a fuel pump of common rail fuel system of a locomotive diesel engine, where the fuel pump is operable to pressurize fuel onto the common rail at 29,000 psi or more, for example.

In one embodiment, the control circuits, controllers or systems described herein may have a local data collection system deployed and may use machine learning to enable derivation-based learning outcomes. The control circuits may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the control circuit may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the control circuit may use evolution strategies techniques to tune various parameters of the artificial neural network. The control circuits may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle control circuit executes that plan to achieve the desired input data to mirror the predicted best outcome scenario. Additionally, the success metric may be a combination of the optimized outcomes, which may be weighed relative to each other.

In a general sense, those skilled in the art will recognize that the various aspects described herein which can be implemented, individually and/or collectively, by a wide range of hardware, software, firmware, or any combination thereof can be viewed as being composed of various types of electrical circuits referred to herein as a control circuit. Consequently, as used herein an "electrical circuit" includes, but is not limited to, a control circuit having at least one discrete electrical circuit, a control circuit having at least one integrated circuit, a control circuit having at least one application specific integrated circuit, a control circuit forming a general purpose computing device configured by a computer program (e.g., a general purpose computer configured by a computer program which at least partially carries out processes and/or devices described herein, or a microprocessor configured by a computer program which at least partially carries out processes and/or devices described herein), a control circuit forming a memory device (e.g., forms of random access memory), and/or a control circuit forming a communications device (e.g., a modem, communications switch, or optical-electrical equipment). Those having skill in the art will recognize that the subject matter described herein may be implemented in an analog or digital fashion or some combination thereof.

Examples of the devices and methods disclosed herein, according to various aspects of the present disclosure, are provided below in the following embodiments. An aspect of the devices and methods may include any one or more than one of, and any combination of, the embodiments described.

In a first embodiment, the present disclosure provides an inlet metering valve (IMV) block that includes at least one body defining a plurality of IMV apertures, an internal fuel passage, a fuel inlet port, and a plurality of mounting holes. Each aperture of the plurality of IMV apertures is adapted to receive at least one IMV of a plurality of IMVs. The internal fuel passage is in fluid communication with the plurality of IMV apertures. Further, the fuel inlet port is fluidically couplable between a fuel inlet connector and the internal fuel passage. The fuel port is configured to transfer fuel from a fuel source to the internal fuel passage. The plurality of mounting holes is configured for releasably attaching the IMV block to a fuel pump.

Additionally, in the first embodiment, the plurality of mounting holes is oriented in a same direction as the fuel inlet port; or the plurality of mounting holes and the fuel inlet port are oriented in a direction that is orthogonal to the plurality of IMV apertures; or any combination thereof.

Alternatively, the at least one body of the first embodiment defines a fuel return port fluidically couplable between a fuel return connector and the internal fuel passage. The fuel return port is configured to transfer fuel from the internal fuel passage to the fuel source.

In a second embodiment, the present disclosure provides an inlet metering valve (IMV) system that includes a first IMV; a second IMV; and an IMV block separable from a fuel pump. The IMV block includes at least one body defining a first IMV aperture, a second IMV aperture, an internal fuel passage, a fuel inlet port, and a plurality of mounting holes. The first IMV aperture is adapted to receive the first IMV and the second IMV aperture is adapted to receive the second IMV. Further, the internal fuel passage is in fluid communication with the first IMV aperture and the second IMV aperture. The fuel inlet port is fluidically couplable between a fuel inlet connector and the internal fuel passage. The fuel inlet port is configured to transfer fuel from a fuel source to the internal fuel passage. The plurality of mounting holes is configured for releasably attaching the IMV block to the fuel pump.

Additionally, the second embodiment includes a control circuit electrically coupled to the first IMV and the second IMV to concurrently operate the first IMV and the second IMV to cooperatively regulate an amount of fuel transferred from the fuel source to the fuel pump; the first IMV is operable to regulate fuel intake for a first period and the second IMV is operable to regulate fuel intake for a second period, the first period and the second period occur consecutively; the first IMV is operable in an inactive state during the second period and the second IMV is operable in an inactive state during the first period; or the first period and the second period periodically repeat, such that the first IMV and the second IMV alternately operate; or any combination thereof.

Alternatively, in the second embodiment, the control circuit is configured to monitor the first IMV for a fault condition, and switch from operating the first IMV to the second IMV based on the control circuit detecting the fault condition; the control circuit is configured to run a diagnostic on the first IMV, determine a diagnosed parameter based on the diagnostic of the first IMV, compare the diagnosed parameter to one or more diagnostic parameter criteria, and switch from operating the first IMV to the second IMV based on the diagnosed parameter meeting the one or more diagnostic parameter criteria; or the diagnosed parameter is at least one of a power output of the first IMV, a fuel pressure from the first IMV, a voltage across the first IMV, or a resistance across the first IMV, or any combination thereof.

Alternatively, in the second embodiment, the first IMV and the second IMV are configured to communicate with the control circuit in a wired or a wireless configuration; the fuel inlet includes a filter to remove debris from the fuel prior to entering the fuel pump; or the at least one body of the IMV block defines a fuel return port fluidically couplable between a fuel return connector and the internal fuel passage, the fuel return port is configured to transfer fuel from the internal fuel passage to the fuel source; or any combination thereof.

In a third embodiment, the present disclosure provides a method of controlling fuel flow from a fuel source to a fuel pump through an inlet metering valve (IMV) block separable from the fuel pump, the method includes determining a number of two or more IMVs operably engaged with the IMV block, selecting an operational mode based on the number of IMVs operably engaged with the IMV block, and operating each IMV of the number of IMVs according to the selected operational mode.

Additionally, the third embodiment includes operating each IMV of the number of IMVs engaged with the IMV block concurrently to cooperatively regulate an amount of fuel transferred from the fuel source to the fuel pump; includes operating a first IMV of the number of IMVs for a first period, after the first period, operating a second IMV of the number of IMVs for a second period, the first period and the second period occur consecutively, and the first period and the second period periodically repeat, such that the first IMV and the second IMV alternately operate; includes operating a first IMV of the number of IMVs, monitoring the first IMV for a fault condition, and switching from operating the first IMV to operating a second IMV of the number of IMVs based on detecting the fault condition; or includes cycling back to the number of IMVs or to a fuel storage reservoir or tank any fuel that is not transferred to the fuel pump; or any combination thereof.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof, collectively referred to herein as a control circuit. In one form, several portions of the subject matter described herein may be implemented via ASIC, FPGA, DSP, or other integrated formats. However, those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuit and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative form of the subject matter described herein applies regardless of the particular type of signal bearing medium used to actually carry out the distribution. Examples of a signal bearing medium include, but are not limited to, the following: a recordable type medium such as a, a hard disk drive, a Compact Disc (CD), a Digital Video Disk (DVD), a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inlet metering valve (IMV) system comprising:
- a first IMV;
- a second IMV;
- a control circuit electrically coupled to the first IMV and the second IMV to concurrently operate the first IMV and the second IMV to cooperatively regulate an amount of fuel transferred from a fuel source to a fuel pump; and
- an IMV block separable from the fuel pump, the IMV block comprising at least one body defining a first IMV aperture, a second IMV aperture, an internal fuel passage, a fuel inlet port, and a plurality of mounting holes, wherein:
  - the first IMV aperture is adapted to receive the first IMV and the second IMV aperture is adapted to receive the second IMV;
  - the internal fuel passage is in fluid communication with the first IMV aperture and the second IMV aperture;
  - the fuel inlet port is fluidically couplable between a fuel inlet connector and the internal fuel passage, the fuel inlet port being configured to transfer fuel from the fuel source to the internal fuel passage; and
  - the plurality of mounting holes are configured for releasably attaching the IMV block to the fuel pump.

2. The IMV system of claim 1, wherein the first IMV is operable to regulate fuel intake for a first period and the second IMV is operable to regulate fuel intake for a second period, wherein the first period and the second period occur consecutively.

3. The IMV system of claim 2, wherein the first IMV is operable in an inactive state during the second period and the second IMV is operable in an inactive state during the first period.

4. The IMV system of claim 3, wherein the first period and the second period periodically repeat, such that the first IMV and the second IMV alternately operate.

5. The IMV system of claim 1, wherein the control circuit is configured to:

monitor the first IMV for a fault condition; and switch from operating the first IMV to the second IMV based on the control circuit detecting the fault condition.

6. The IMV system of claim 5, wherein the control circuit is configured to:

run a diagnostic on the first IMV;

determine a diagnosed parameter based on the diagnostic of the first IMV;

compare the diagnosed parameter to one or more diagnostic parameter criteria; and switch from operating the first IMV to the second IMV based on the diagnosed parameter meeting the one or more diagnostic parameter criteria.

7. The IMV system of claim 6, wherein the diagnosed parameter is at least one of a power output of the first IMV, a fuel pressure from the first IMV, a voltage across the first IMV, or a resistance across the first IMV, or any combination thereof.

8. The IMV system of claim 1, wherein the first IMV and the second IMV are configured to communicate with the control circuit in a wired or a wireless configuration.

9. The IMV system of claim 1, wherein the at least one body of the IMV block defines a fuel return port fluidically couplable between a fuel return connector and the internal fuel passage, wherein the fuel return port is configured to transfer fuel from the internal fuel passage to the fuel source.

10. A method of controlling fuel flow from a fuel source to a fuel pump through an inlet metering valve (IMV) block separable from the fuel pump, the method comprising:

determining a number of two or more IMVs operably engaged with the IMV block, operating a first IMV of the number of IMVs;

monitoring the first IMV for a fault condition; and switching from operating the first IMV to operating a second IMV of the number of IMVs based on detecting the fault condition;

selecting an operational mode based on the number of IMVs operably engaged with the IMV block; and operating each IMV of the number of IMVs according to the selected operational mode.

11. The method of claim 10, comprising operating each IMV of the number of IMVs engaged with the IMV block concurrently to cooperatively regulate an amount of fuel transferred from the fuel source to the fuel pump.

12. The method of claim 10, comprising operating the first IMV of the number of IMVs for a first period, after the first period, operating the second IMV of the number of IMVs for a second period, wherein the first period and the second period occur consecutively, and wherein the first period and the second period periodically repeat, such that the first IMV and the second IMV alternately operate.

13. The method of claim 10, comprising cycling back to the number of IMVs or to a fuel storage reservoir or tank any fuel that is not transferred to the fuel pump.

* * * * *